INVENTORS
BORIS F. GRIB
ROBERT R. SHREVE
BY Darby & Darby
ATTORNEYS

INVENTORS
BORIS F. GRIB
ROBERT R. SHREVE
BY Darby & Darby
ATTORNEYS 3,425,310
Patented Feb. 4, 1969

3,425,310

BALANCED AND COUPLED TUNING FORK MOUNTING STRUCTURE FOR SUPPRESSING REED VIBRATION

Boris F. Grib and Robert R. Shreve, Huntington, N.Y., assignors to Philamon Laboratories Inc., Westbury, N.Y., a corporation of New York Continuation-in-part of application Ser. No. 339,762, Jan. 23, 1964. This application Dec. 6, 1966, Ser. No. 599,522
U.S. Cl. 84—457 13 Claims
Int. Cl. G10g 7/02

ABSTRACT OF THE DISCLOSURE

A pair of tuning forks is provided having electrical drive and pick-up means, each of the forks having a pliant section between the heel and the tines. The heels of the respective forks are physically coupled together to in effect form a third tuning fork with each one of the coupled forks acting as a tine for the third fork. Each of the coupled forks, which would otherwise be vibratable independently as a reed, is strongly urged to vibrate only in unison with the other fork of the pair thus permitting suppression of undesirable reed mode vibrations of the tuning forks.

This application is a continuation-in-part of copending application Ser. No. 339,762, now Patent 3,290,609, for Double Fork Tuning Fork Resonator Filters filed Jan. 23, 1964, in the name of Robert R. Shreve.

It is known that the performance of a tuning fork is enhanced in many respects by providing a pliant section in the fork between the tine junction and the heel mounting (see U.S. Pat. No. 2,806,400). Especially good performance is obtained when the flexibility of the pliant section is related to the mass of the tines so that the two tines together are vibratable as a reed at a resonant frequency approximately 75% of the tuning fork resonant frequency. The presence of this secondary resonant frequency in the tuning fork structure tends to create other problems however.

It will be appreciated that if the fork were exposed to a vibration environment with vibration frequency components at this "reed frequency" the effectiveness of the tuning fork would be seriously diminished unless steps for suppressing the reed frequency vibration were taken. By the same token the presence of an electrical signal in the tuning fork drive circuit at the reed frequency would present a potential problem.

Various measures for avoiding problems associated with the reed frequency resonance have been proposed. One expedient has involved the use of dual pick-up and dual drive coils for a tuning fork with the pick-up coil and also the drive coil arranged so that their action is cooperative with respect to the fork mode of vibration but tends to cancel with respect to the reed mode of vibration. This expedient however results in placement of drive and pick-up coils in close proximity producing undesirable inductive coupling which gives rise to a different problem.

The present invention is particularly adaptable to dual tuning fork applications but is also useful in single tuning fork applications, in which case one tuning fork would be inoperative or a dummy structure. By the present invention a pair of tuning forks are physically coupled by a coupling structure connected to the respective heels of the fork so that the reed vibration of the two forks is constrained to be in unison in a manner analogous to that in which the vibrations of the tines of a single tuning fork are constrained to be in unison. The coupling structure provides immunity to vibrational environments just as a tuning fork is less sensitive to vibrational environments than would be a reed type resonator. Furthermore, since the reed vibrations of the two tuning forks are constrained to be in unison or "phase-locked," a balanced or cancellation effect can be obtained as between one fork with respect to the other by appropriate arrangement of drive coils (or pick-up coils). As a result one can dispense with the dual drive and pick-up for an individual fork and thereby greatly diminish the inductive coupling problem. That is, with a single drive and a single pick-up on opposite sides of a tuning fork it is possible to magnetically shield the pick-up coil from the drive coil to a high degree.

The present invention accordingly provides a pair of tuning forks coupled physically to, in effect, create a third fork thereby alleviating the reed frequency vibration problem to a degree not heretofore possible.

In addition to providing the advantages described above it is an object of the present invention to suppress reed vibrations in a tuning fork structure by providing balanced and coupled structures wherein a tuning fork in its reed vibration mode acts effectively as the tine of a larger tuning fork.

It is another object of the present invention to provide a tuning fork structure comprising a pair of tuning forks physically coupled between the heels thereof causing the reed vibrations of the respective tuning forks to tend to be in unison rather than independent whereby balancing or cancellation techniques can be utilized as between the reed vibrations of the two forks.

Other objects and advantages will be apparent from a consideration of the following description in conjunction with the appended drawings in which.

Figure 1:
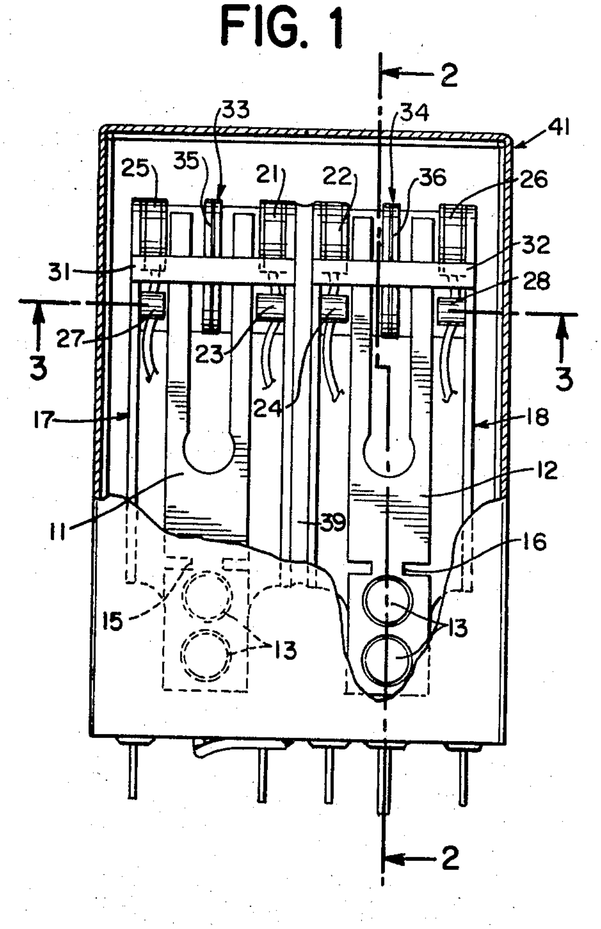
FIG. 1 is a top plan view partially cut away showing a double tuning fork resonator according to the present invention.
Figure 2:
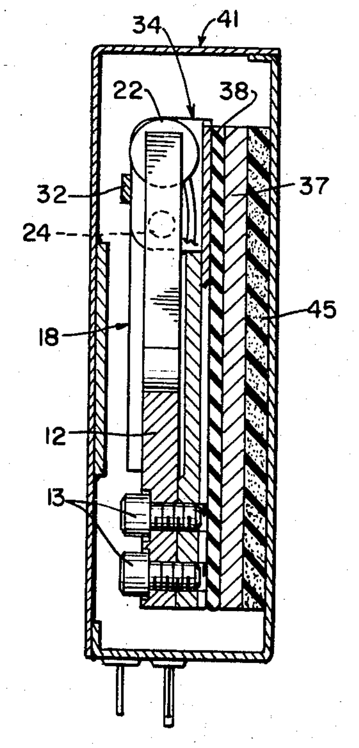
FIG. 2 is a sectional view of the structure of FIG. 1 taken along the line 2—2 in FIG. 1.
Figure 3:
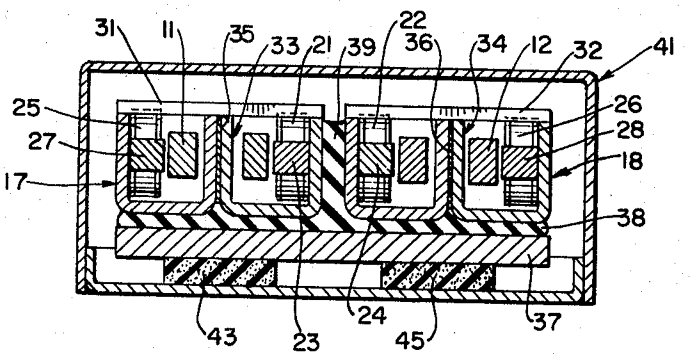
FIG. 3 is a sectional view of the structure of FIG. 1 taken along the line 3—3 in FIG. 1.

Referring now to FIGS. 1 through 3, a preferred embodiment of the invention is shown for illustrative purposes and which is adapted for various uses such as a double fork tuning fork resonator filter, as more fully described in co-pending application Ser. No. 339,762 in the name of Robert R. Shreve. The apparatus of FIGS. 1 through 3 comprises a pair of tuning forks 11 and 12. The tuning forks 11 and 12 are provided in their heel portion with means illustratively shown as bolts 13, for substantially rigidly mounting them to a base structure.

Pliant sections 15 and 16 are provided for the tuning forks 11 and 12 respectively, the function of which is known from U.S. Pat. No. 2,806,400 to Boris F. Grib and is fully explained therein.

Tuning forks 11 and 12 are mounted on respective base channels 17 and 18 which are preferably formed of a magnetic material with good permeability thereby improving the magnetic circuits for the drive and pick-up coils, later described. A pair of pick-up coils 21 and 22 are rigidly mounted to the base channels 17 and 18. Coils 21 and 22 (and the other coils in the apparatus) are wound about a permanent magnet core so that a constant bias magnetic flux is provided in accordance with common practice. The efficiency of the pick-up coils may be further enhanced by additional permanent magnets 23 and 24.

Drive coils 25 and 26 are also rigidly mounted to base channels 17 and 18 respectively and associated therewith are permanent magnets 27 and 28 for providing additional magnetic bias.

When the apparatus is expected to be exposed to vibrational environments, it is desirable to further rigidify the base structures by welding or otherwise securing straps 31 and 32 across the base channels 17 and 18 respectively. Straps 31 and 32 are preferably formed of substantially non-magnetic material such as stainless steel.

Each of the base channels 17 and 18 is formed of a pair of stampings which are joined together by welding, brazing or the like to form the completed channel. The stampings are provided with upturned portions which form magnetic shields 33 and 34, the function of which is to minimize magnetic coupling between the drive coil and the pick-up coil of a respective tuning fork. The shielding is further enhanced by the inclusion of a thin (for example .001 inch) shim 35 (or 36) of non-magnetic material in the middle of magnetic shield 33 (or 34) respectively. Other magnetic shielding techniques may be used in addition to or as an alternative to those described.

The structure thus far described is at the same time compact, vibration resistant, and is arranged to greatly diminish inductive coupling between a fork drive coil and its pick-up coil. Such inductive coupling is obviously undesirable since one desires to have no unfiltered output from the pick-up coil.

The base channels 17 and 18 act as a coupling structure to physically couple the heels of tuning forks 11 and 12 so that the effect of a third tuning fork is created as previously mentioned. Advantages of the present invention could be obtained by rigidly connecting base channel 17 to base channel 18, but it is preferable, for reasons which will be more fully explained hereinafter, that the inter-connection of base channels 17 and 18 be of an energy absorbing nature. Accordingly, channel 17 and channel 18 are joined by a layer of silicone rubber adhesive of substantial thickness; adhesive sold under the trademark Silastic 140 is found to be satisfactory. The channels 17 and 18 may typically be formed of stock of .024" thickness, and the adhesive layer joining the channels may be of similar thickness. It is often found desirable to minimize the possibility of flexing of the adhesive joint between channels 17 and 18 by providing a rigid plate 37 attached to the base of channels 17 and 18 by a silicone rubber adhesive layer 38 similar to the layer 39 between channels 17 and 18.

It would be undesirable both from the point of view of vibration isolation and from the point of view of exploiting the third fork characteristics to rigidly connect plate 37 to the housing 41 serving as the container for the fork apparatus. A suitable resilient energy absorbing support and connection for plate 37 is provided by a pair of pads of silicone rubber sponge 43 and 45. The pads 43 and 45 may typically be of a thickness of one-sixteenth inch and may be adhered to the plate 37 and the housing 41 by any suitable adhesive, such as a silicone rubber adhesive. Suitable stiffness for the plate 37 is provided by a steel plate of approximately .05" thickness. The exemplary dimensions given assume a structure with tuning forks of overall length of approximately 1½" and of course appropriate changes in dimensions may be indicated for larger or smaller tuning fork structures.

The manner of making the desired electrical connections through the housing do not form a part of the present invention and the details thereof have been omitted for simplicity. The manner of interconnection of the pick-up coils and of the drive coils is illustrated in the schematic diagrams for better clarity of presentation.

Figures 4A, 4B, 4C, 4D:
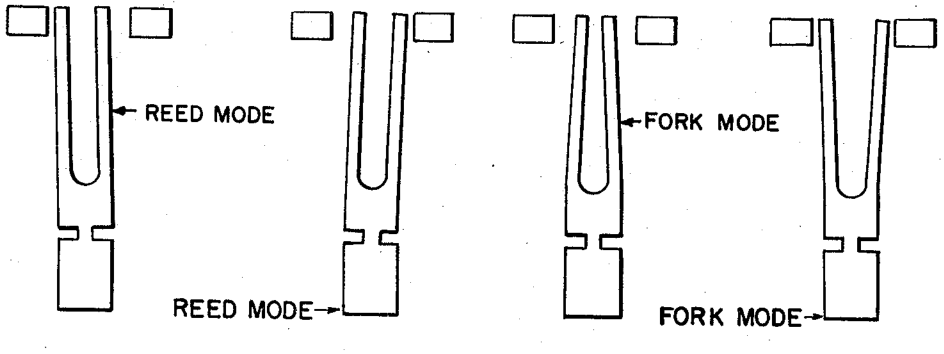
FIGS. 4A through 4D are schematic illustrations of vibrational modes of tuning forks presented to aid in the explanation of the present invention.

To understand the operation of apparatus according to the invention such as illustrated in FIGS. 1 through 3 it is useful to first explain the distinction between reed mode vibration of a tuning fork and fork mode vibration of a tuning fork. Referring to FIGS. 4A through 4D the extreme vibratory movement in the reed mode of vibration are illustrated by FIGS. 4A and 4B. From these illustrations it will be understood that in the reed mode of vibration the tines of the tuning fork move in the same direction at the same time. From FIGS. 4C and 4D illustrating the fork mode of vibration it will be seen that in this mode the tines of the tuning fork move in opposite directions at the same time. One desires, of course, to exploit the fork mode vibration of the apparatus and to minimize the effect of the reed mode vibration.

Figure 5A:
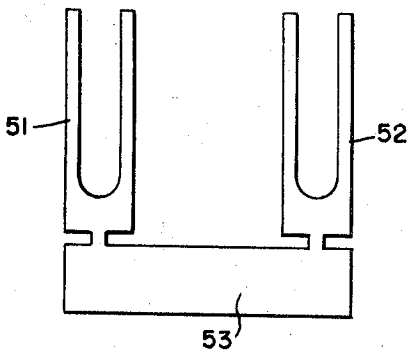
FIGS. 5A through 5C are simplified schematic illustrations of steps in the development of apparatus according to the present invention presented to aid in the understanding thereof.

A fundamental aspect of the present invention involves the conversion of the independent resonant reeds of a pair of tuning forks into a "third fork." This aspect of the invention is illustrated schematically in FIG. 5A. In FIG. 5A it will be seen that a pair of forks 51 and 52 have been mechanically coupled at their heels by a coupling structure 53.

Figure 5B:
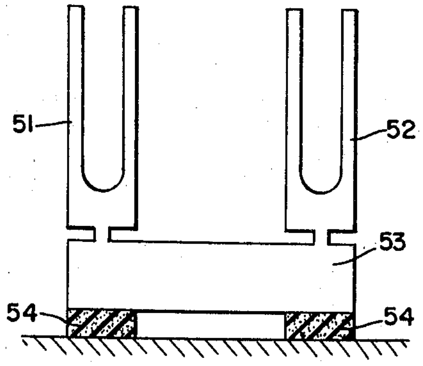

For the tuning forks 51 and 52 to operate effectively as the tines of the "third fork" the entire structure of FIG. 5A should be non-rigidly supported with respect to a fixed base. A suitable non-rigid support may be provided by silicone rubber sponge pads 54 as illustrated in FIG. 5B. The support of forks 51 and 52 and the coupling structure 53 may have substantial compliance which implies substantial displacement under vibration and shock conditions. This is possible because the drive and pick-up coils for forks 51 and 52 are rigidly secured with respect to the heels of their respective forks so that displacement of the structure of FIG. 5A by virture of the compliance of its mounting (as by sponge pads 54) is not detrimental because it results in no relative motion between the tines of forks 51 and 52 and their respective drive and pick-up coils.

Obviously it is desirable that the reed frequency of the fork 51 be quite nearly equal to the reed frequency of the fork 52 to enhance the effectiveness of the third fork structure. It is a well known characteristic of tuning forks that they provide great resistance to any vibration of the tines of the fork except vibration at the same frequency for both tines with the tines moving in opposite directions at any given time. A tuning fork thus has substantial inherent vibration and shock resistance since inertial forces acting on the tines are in the *same* direction for both tines at any given time and hence meet with great resistance. Arrangement of the forks 51 and 52 as tines of a "third fork" is thus very advantageous. Furthermore, the fact that the reed vibrations of forks 51 and 52 are constrained to be in unison makes it possible for driving forces to be applied to a single tine of each of the forks 51 and 52 which are opposite to that required for the permitted mode of vibration of the "third fork."

It is neither necessary, nor as will be seen, desirable, for the "third fork" to have a high Q, and on the other hand it may be quite lossy. That is to say the third fork may serve its intended function even though it is arranged so that third fork vibrations die out rapidly in the event that they are induced. Due to the impossibility of perfectly balancing tuning forks 51 and 52 or of perfectly balancing drive forces due to the respective drive coils of the forks, some vibrations of the "third fork" in the fork mode will unavoidably be induced. These vibrations may be kept at a very low level by introducing losses in the third fork. This is illustrated schematically in FIG. 5C which shows the introduction of a segment of lossy material 55 between halves of the coupling structure 53, which has been divided for the insertion of the lossy material. The lossy material 55 in the schematic representation of FIG. 5C takes the form of layers of silicone rubber 38 and 39 in the practical embodiment of FIGS. 1 through 3.

Figure 5C:
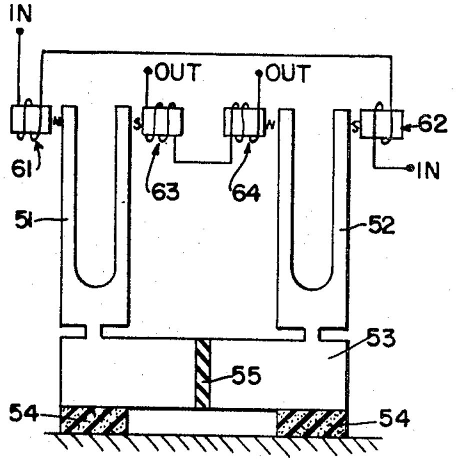

In FIG. 5C drive coils 61 and 62 and pick-up coils 63 and 64 are also illustrated schematically. It should be noted that in the practical embodiment these coils are rigidly supported with respect to the heels of their associated tuning forks. Accordingly, the coils and the structure which holds them rigid with respect to the heels of the tuning forks are a factor in determining the characteristics of the "third fork." The mass of the coils and other structure rigidly secured to the heels of the forks should be kept relatively low, if the reed vibration of the forks is to be kept in unison. It is believed that ideally such mass should approximate the mass of the fork tines (including their junction portion) and in any event the mass should be less than from ten to twenty times that of the fork tines. In the practical embodiment illustrated in FIGS. 1 through 3 the mass of the fork heel portion and of the coupling structure and coils rigidly secured thereto is approximately twice that of the fork tines.

As previously mentioned, the present invention not only results in the suppression of reed mode vibrations from purely physical or mechanical considerations, but it also permits the arrangement of drive and pick-up coils to obtain a balancing or cancelling effect for unwanted signals to a greater degree than possible in double tuning fork arrangements where reed vibrations of the tuning forks are not constrained to be in unison.

Figure 6:
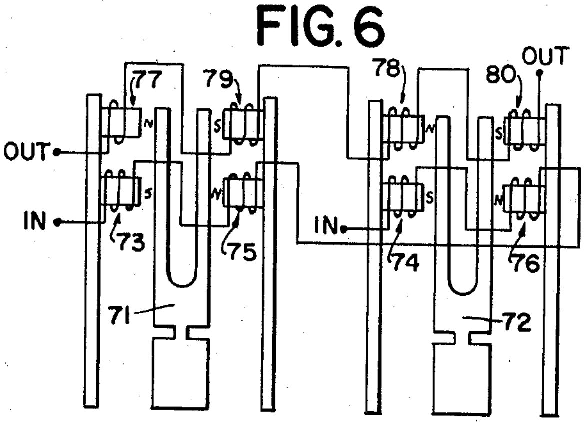
FIG. 6 is a schematic illustration of a pick-up and drive coil arrangement for dual tuning forks which may be adapted for use with the present invention and which is presented to aid in the explanation of the invention.

Appropriate connections of coil windings to obtain these additional advantages can best be described and explained by first referring to FIG. 6 showing balanced drive and pick-up double tuning fork arrangements in accordance with co-pending application Ser. No. 339,762 in the name of Robert R. Shreve.

In FIG. 6 a first fork 71 is provided having drive coils 73 and 75 symmetrically disposed with respect thereto and having pick-up coils 77 and 79 also symmetrically disposed.

A second tuning fork 72 has drive coils 74 and 76 and pick-up coils 78 and 80 arranged in a manner identical to that of fork 71. It is known that a tuning fork may be driven quite effectively with a single drive coil adjacent only one tine of the fork due to the strong physical coupling constraining the fork tines to vibrate in unison. Obviously, a single pick-up coil is adequate to provide a signal responsive to the tuning fork tine vibrations. Dual drive and pick-up coils as illustrated in FIG. 6 are useful to achieve cancellation with respect to coupling to or from the reed mode of vibration of a tuning fork. Note for example that drive coils 73 and 75 are arranged with a magnetic bias polarity, winding direction, and series interconnection such that the forces imparted to the tines of fork 71 from drive coils 73 and 75 are in opposite directions at any given time. Thus, if the forces due to the coils are equal, there will be no tendency to impart a reed vibration to fork 71.

In a similar fashion, pick-up coils 77 and 79 are arranged so that any reed frequency vibration of forks 71 would tend to produce self-cancelling signals in pick-up coils 77 and 79.

In the appartus of FIG. 6 it is necessary to provide the above-described balancing or cancelling effect with respect to each fork independently because the reed vibrations of the forks 71 and 72 are not in unison, being of indeterminate phase relationship and possibly different frequency. Referring now to FIG. 5C, however, it will be observed that similar cancelling effects can be obtained with half the number of drive and pick-up coils due to the fact that the reed vibrations of the two forks 51 and 52 are constrained to be in unison.

It will be noted in FIG. 5C, for example, that the magnetic bias polarity and winding direction of drive coils 61 and 62 is such that the force relationship applied to the forks 51 and 52 is opposite to that which would produce vibrations of the "third fork". Hence, virtually no reed vibrations of forks 51 and 52 are induced by the drive coils 61 and 62, notwithstanding the fact that, as to each individual tuning fork, there is a single-coil unbalanced drive.

In the apparatus of FIG. 6 the coil windings and connections are carefully arranged so that any inductive coupling which exists between the coils of one of the tuning forks tends to be canceled by inductive coupling of opposite phase in the coils associated with the other tuning fork. A similar expedient may be utilized in the apparatus of FIG. 5C. Far greater reduction of inductive coupling may be achieved, however, using only one drive and one pick-up coil for each tuning fork.

Numerous variations in the windings and magnetic bias polarity may be devised. Utilizing FIG. 5C as one example, further examples may be contrived by modification according to certain rules. As to either or both tuning forks if both windings and polarities are reversed a suitable arrangement will be obtained. If as to both forks either all windings are reversed or all bias polarities are reversed a suitable arrangement will be provided.

It should be noted that the arrangement of FIG. 5C contemplates that the fork frequencies of forks 51 and 52 shall be slightly different. The apparatus thus operates as a narrow bandpass filter wherein the outputs from the two forks are substantially in phase opposition except in the filter pass-band frequency range. The advantages of the present invention are of course not limited to this particular application and are also applicable to double tuning fork arrangements in which the tuning forks are operated in phase in parallel. Furthermore, the outputs from the forks may be independent rather than common.

It will be noted in the particular arrangement illustrated in FIG. 5C that third fork vibrations, if they are present, will appear in the output without cancellation. To the extent that any problem is thereby created, it is readily possible to provide an electronic filter of conventional type using inductive and/or capacitive electrical components to virtually eliminate any output signal at the third fork frequency.

The elimination of third fork frequency output is facilitated by the fact that the use of a slightly resilient lossy coupling between forks 51 and 52 tends to lower the third fork frequency below the natural frequency of reed vibration of either of the forks taken independently. Thus it is readily possible to maintain the individual fork reed frequency near a desired value of approximately 75% of fork frequency and to determine the nature of the coupling between the forks to provide a third fork frequency of slightly above one-half of the tuning fork frequencies. A third fork frequency having this relationship to the tuning fork frequencies is quite easily suppressed by electronic filtering. Accordingly, input terminals of a band-reject filter at a third fork frequency of somewhat over half the tuning fork frequency will frequently be connected to the output of the apparatus of FIG. 5C although it is not so illustrated. Numerous other possible refinements to the apparatus of FIGS. 1–3 and 5C such as pre-amplifiers or post-amplifiers have been omitted for simplicity but may be incorporated as needed.

The arrangement of FIG. 5C may also be modified so that third fork vibrations will cancel in the output coil circuit. The input coil circuit may be arranged so that it would tend to induce third fork vibrations and electronic filtration may be provided in the input circuit to suppress third fork frequency drive coil forces.

Numerous other variations in the arrangement of drive and pick-up coils may be provided while still taking advantage of desirable features of the present invention. As previously described, the purely physical or mechanical reed frequency vibration suppression provided by the present invention is sufficiently important that the invention is useful for single tuning fork applications such as tuning fork oscillators for frequency standards or the like. In such a case, a conventional tuning fork oscillator balanced or unbalanced drive coil and pick-up coil arrangement may be utilized with respect to one tuning fork of the pair of tuning forks and the other tuning fork may be utilized simply as a dummy with only sufficient features of the operating tuning fork duplicated to provide proper mechanical balance for the "third fork." Alternatively, the dummy tuning fork may be artificially balanced without duplicating the operating tuning fork and its associated elements.

What is claimed is:

1. Tuning fork apparatus comprising a tuning fork with a longitudinal axis having a pair of tines extending parallel thereto, a tine junction portion, a heel portion and a pliant portion connecting said heel portion and said time junction portion such that said tines and tine junction portion would be collectively vibratable as a reed at a predetermined reed vibration frequency with respect to said heel portion if the latter were rigidly secured; a complementary structure with a longitudinal axis and having a pliant portion and an elongated vibratable mass portion extending along the last said axis, said structure being substantially matched to said tuning fork reed vibration frequency; mounting means for supporting said complementary structure in a vibratable manner; a physical coupling between said tuning fork heel portion and said complementary structure mounting means whereby vibrations of said complementary structure and reed vibrations of said tuning fork tend to be in unison rather than independent, said complementary structure having a preferred plane of vibration substantially coincident with a preferred plane of vibration of said tuning fork reed vibration; means for resiliently supporting the combination of said tuning fork, said complementary structure and said physical coupling; and a transducer for sensing tine vibrations of said tuning fork.

2. Apparatus as claimed in claim 1 wherein said physical coupling includes an energy absorbing element.

3. Apparatus as claimed in claim 2 wherein said tuning fork and said complementary structure longitudinal axes extend in substantially the same direction from their respective support points.

4. Apparatus as claimed in claim 2 wherein said reed vibration frequency is less than the resonant frequency of said fork.

5. Apparatus as claimed in claim 2 wherein said transducer is a magnetically biased coil and further including a magnetically biased drive coil substantially rigidly fixed with respect to said tuning fork heel portion.

6. Tuning fork apparatus comprising a pair of tuning forks each having a pair of tines, a tine junction portion, a heel portion and a pliant portion connecting said heel portion and said tine junction portion such that said tines and tine junction portion of the respective forks would each be vibratable as a reed substantially in a common plane with the vibration of said tines and at a predetermined reed vibration frequency with respect to its respective heel portion if the latter were rigidly secured; said pair of tuning forks being substantially matched with respect to said reed vibration frequency; a physical coupling between the respective ones of said tuning fork heel portions whereby reed vibrations of respective ones of said pair of tuning forks tend to be in unison rather than independent; isolation means for resiliently supporting the combination of said pair of tuning forks and said physical coupling; and at least one transducer for sensing tine vibrations of at least one of said tuning forks.

7. Apparatus as claimed in claim 6, wherein the mass of said tines and tine junction portions is more than one-twentieth the total mass supported by said isolation means.

8. Apparatus as claimed in claim 6 wherein the respective fork resonant frequencies of said pair of forks are significantly different.

9. Apparatus as claimed in claim 6 wherein said physical coupling includes an energy absorbing element.

10. Apparatus as claimed in claim 6 wherein the preferred plane of reed vibration of each of said forks is substantially coincident with that of the other.

11. Apparatus as claimed in claim 10 wherein the longitudinal axes of said forks extend in substantially the same direction from their respective support points.

12. Apparatus as claimed in claim 11 further including a magnetically biased pair of drive transducer coils and a magnetically biased pair of pick-up transducer coils for said pair of forks with at least one of said pairs of coils arranged for cancellation of transducer action with said pair of forks in the case of substantially equal and opposite vibration thereof.

13. In a tuning fork resonator having a tuning fork, at least one pick-up coil, at least one drive coil, and mounting structure for mounting said coils adjacent said fork, the improvement comprising a magnetic shield between said coils having a first magnetically permeable portion connected by a magnetically permeable path in said structure to said pick-up coil, a second magnetically permeable portion connected by a magnetically permeable path in said structure to said drive coil, and a relatively low permeability separation between said portions.

References Cited

UNITED STATES PATENTS

| | | | |
|---|---|---|---|
| 3,134,035 | 5/1964 | Grib | 331—156 |
| 3,107,481 | 10/1963 | Oram | 310—25 |

RICHARD B. WILKINSON, *Primary Examiner.*

GARY M. POLUMBUS, *Assistant Examiner.*

U.S. Cl. X.R.

58—23; 84—409